United States Patent [19]

Davidson

[11] Patent Number: 5,232,968
[45] Date of Patent: Aug. 3, 1993

[54] STABILISED POLYKETONE COMPOSITION

[75] Inventor: Neil S. Davidson, Stirling, United Kingdom

[73] Assignee: BP Chemicals Limited, London, England

[21] Appl. No.: 796,480

[22] Filed: Nov. 22, 1991

[30] Foreign Application Priority Data

Nov. 27, 1990 [GB] United Kingdom ............... 9025770

[51] Int. Cl.$^5$ ........................... C08K 5/05; C08K 5/15
[52] U.S. Cl. ..................................... 524/381; 524/114
[58] Field of Search ............... 524/381, 327, 114, 392

[56] References Cited

U.S. PATENT DOCUMENTS

| | | | |
|---|---|---|---|
| 3,948,832 | 4/1976 | Hudgin | 528/392 |
| 4,761,448 | 8/1988 | Kluttz et al. | 524/612 |
| 4,950,703 | 8/1990 | Smutny | 524/327 |

FOREIGN PATENT DOCUMENTS

| | | |
|---|---|---|
| 0310166 | 4/1989 | European Pat. Off. . |
| 157618P | 5/1982 | Japan . |
| 58-194937 | 11/1983 | Japan . |

OTHER PUBLICATIONS

Chemical Abstracts, vol. 100, No. 20, 14 May 1984, Columbus, Ohio, U.S.; Abstract No. 157618P.

*Primary Examiner*—Paul R. Michl
*Assistant Examiner*—Tae H. Yoon
*Attorney, Agent, or Firm*—Brooks Haidt Haffner & Delahunty

[57] ABSTRACT

A polymer composition stabilised against degradation during melt processing which comprises (a) major amount of a linear alternating copolymer of carbon monoxide, ethylene, and a $C_3$–$C_6$ normal olefin (b) a minor effective amount of a first stabiliser comprising an aluminium trialkoxide, an aluminium phenoxide or an aluminium containing hydrolysis product of such compounds and (c) a minor effective amount of a second stabiliser comprising an organic epoxy containing compound. The aluminium trialkoxide is suitably aluminium isopropoxide and the organic epoxy containing compound is, for example, epoxidised soybean oil.

12 Claims, No Drawings

STABILISED POLYKETONE COMPOSITION

The present invention relates to a stabilised polymer composition containing a copolymer of carbon monoxide and one or more olefins. In particular the invention relates to compositions containing such copolymers which exhibit good stability in processes during which the composition is melted and subsequently solidfied.

The preparation of random copolymers of a minor amount of carbon monoxide and a major amount of ethylene by catalysed radical polymerisation has been known for some years. More recently it has been found that linear alternating copolymers of carbon monoxide and one or more olefins, hereafter called polyketones, can be prepared by contacting the reactants with a Group VIII metal catalyst preferably comprised of palladium and a bidentate phosphine, see for example EP 121965.

The polyketones prepared by this process, whilst being thermoplastics, suffer from the disadvantage that they have relatively high melting points close to temperatures at which they undergo chemical degradation. This causes a problem since the materials are thus difficult to process using conventional melt technology.

In order to overcome this problem a number of potential approaches have been explored. EP 213671 teaches that polyketones comprised of carbon monoxide, ethylene and alpha olefin (e.g. propylene) units have lower melting points than corresponding materials comprised only of carbon monoxide and ethylene units. Whilst this approach goes some way to alleviating the problem, there is still a need to improve further the melt processing stability of polyketones if they are to be processed successfully on a commercial scale.

Methods of further improving melt processability have centered around a) the blending of polyketones with other polymers, b) the addition of plasticisers and c) the use of additives claimed to interfere with the degradation reactions which the polyketones undergo. The first two types of approach suffer in that relatively large amounts of the second polymer of plasticiser are required, a consequence of which is that there is a general deterioration in the physical, mechanical and barrier properties of the polyketone. An example of the third type of approach is disclosed in EP 310166. This patent teaches the addition of an aluminium alkoxide or a derivative thereof. Examples of preferred additives are those having the general formula $Al(OR)_3$ where each R is independently $C_1$ to $C_{12}$ alkyl. A disadvantage of this approach is, however, that it has only limited effectiveness. For example, we have found that whilst there is a stability increase in using 1% of such materials with the polyketones, there is no substantial further benefit obtained when higher levels are used.

A related patent, U.S. Pat. No. 4,950,703 teaches the use of aluminium phenoxide and ring substituted derivatives thereof.

Another example of this approach is taught in U.S. Pat. No. 3,948,832. According to this patent, organic epoxy-containing compounds are useful stabilisers for ethylene/carbon monoxide copolymers although the experimental evidence is rather qualitative. Our investigations have shown that these materials are not very effective stabilisers for melt processing. Epoxy-containing compounds are also referred to in United States Statutory Invention Registration H732 published 6th Feb. 1990.

Japanese Kokai 58194937 (Chemical Abstracts No. 100 157618p (1984)) teaches the use of aluminium isopropylate together with a Ba-Zn stabiliser, phosphite esters, epoxidised soyabean oil and phenol antioxidants to improve the thermal stability and processability of carbon monoxide-ethylene-vinyl acetate copolymers.

Finally EP 326224 teaches the use of a combination of an aluminium alkoxide and an aromatic amine to improve melt flow processability. The use of sterically hindered phenols and $C_5$ to $C_{30}$ mono- or polycarboxylic acid amides are also taught as being useful.

To summarise, the prior art discussed above, whilst teaching the use of aluminium alkoxides on the one hand and epoxy containing compounds on the other, makes no suggestion that it would be desirable to use both together to stabilise polyketones. It has now been found that when both these additives are added to polyketones, the resultant compositions exhibit a marked and unexpected improvement in melt processability which is over and beyond that expected on the basis of their individual effects.

According to the present invention there is therefore provided a polymer composition stabilised against degradation during melt processing which comprises (a) a major amount of a polymer of carbon monoxide and at least one olefin (b) a minor effective amount of a first stabiliser comprising an aluminium trialkoxide, an aluminium phenoxide or an aluminium containing hydrolysis product of such compounds and (c) a minor effective amount of a second stabiliser comprising an organic epoxy containing compound.

The stabilised polymer compositions of the present invention have a number of advantages over those disclosed in the prior art. Firstly the combination of the two stabilisers provides an enhanced stabilisation of melt flow rate over that which can be achieved with either of the stabilisers individually. Secondly, addition of the epoxy containing compound allows better control over the melt temperature on processing and improves the performance of the aluminium alkoxide. Finally the addition of the aluminium alkoxide reduces the level of epoxy-containing compound required to produce a given level of stabilisation and thus reduces the detrimental effects on mechanical, physical and barrier properties of the polyketone caused by the presence of high levels of this additive.

By the term polymer of carbon monoxide and at least one olefin mentioned above is meant any polymer containing units derived from carbon monoxide on the one hand and from the olefin(s) on the other. This definition includes both random polymers produced by radical polymerisation and polyketones. However the use of the combination of the stabilisers defined above is particularly effective when applied to polyketones. For the purposes of this patent, polyketones are defined as linear polymers having an alternating structure of (a) units derived from carbon monoxide and (b) units derived from one or more olefins. Suitable olefin units are those derived from $C_2$ to $C_{12}$ alpha-olefins and substituted derivatives thereof and styrene or its alkyl substituted derivatives. It is preferred that such olefin or olefins areselected from $C_2$ to $C_6$ normal alpha-olefins and it is particularily preferred that the olefin units are either derived from ethylene or most preferred of all from ethylene and one or more $C_3$ to $C_6$ normal alpha-olefin e.g. propylene. Amongst these most preferable materials, it is further preferred that the molar ratio of ethylene units to $C_3$ to $C_6$ normal alpha-olefin units is greater than or equal to 1 most preferably between 2 and 30.

The polyketones described above are suitably prepared by the processes described in EP 121965 or modifications thereof. In general terms, this comprises reacting carbon monoxide and the chosen olefin(s) at elevated temperature and pressure with a catalyst which is preferably comprised of palladium, a bidentate phosphine such as a $C_2$ to $C_6$ bis(diphenylphosphino)alkane and an anion which either does not coordinate to the palladium or coordinates only weakly. Example of such anions include p-toluenesulphonate, tetrafluoroborate, borosalicylate and the like. The process is suitably carried out at a temperature in the range 50° to 150° C., a pressure in the range 25 to 75 bar gauge and in a solvent such as methanol, acetone, THF and the like.

As regards the first stabiliser this is suitably for example an aluminium alkoxide having the general formula $Al(OR)_3$ where the R groups are independently $C_3$ to $C_{36}$ alkyl groups or substituted derivatives thereof. Preferably the R groups are independently $C_3$ to $C_{12}$ alkyl groups or substituted derivatives thereof. The alkyl groups may contain primary, and/or secondary and/or tertiary carbon atoms as the case may be.

More preferred examples of such first stabilisers are compounds having the general formula given above where the R groups are identical secondary alkyl groups having 3 to 8 carbon atoms. Of these compounds, most preferred of all is aluminium trisisopropoxide.

Alternatively, the first stabiiser can be an aluminium phenoxide of formula $(Z)_{3-x}Al(OR^1)_x$ where the Z groups are independently phenoxide or substituted phenoxide, the $R^1$ groups are independently $C_1$ to $C_{10}$ alkyl, preferably $C_1$ to $C_{10}$ branched alkyl, and x is 0, 1 or 2. Preferred examples of this class are those compounds where the phenoxide group is di- or trisubstituted at the 2,6-; 2,4-; 3,5-or 2,4,6-position with $C_3$ to $C_5$ branched alkyl especially tertiary alkyl, e.g. tert-butyl groups.

The amount of first stabiliser user should be in the range 0.1 to 10 parts per hundred parts by weight of the composition for effectiveness, preferably 0.3 to 3 most preferably 0.5 to 1.5.

Turning to the second stabiliser this can in principle be any organic compound containing one or more epoxy groups and which is (1) free of substituents which could adversely effect the properties of the polymer compositions, (2) not substantially volatile at the processing temperature and (3) does not fume at this temperature. The organic compound can be aliphatic, including cycloaliphatic, or aromatic but preferably does not have olefinic unsaturation which is subject to oxidative degradation. Preferred examples of such compounds are epoxy substituted ethers, esters, phosphonates and the like as well as high molecular weight polymers which are epoxy substituted. Most preferred compounds are those comprised of at least 6 carbon atoms including 1,2-epoxyoctadecane, styrene epoxide, butyl-epoxy stearate, epoxidised polybutadiene, poly(alkylglycidyl)ethers, p-chlorophenoxypropylene oxide, dicyclopentadiene diepoxide, diglycidyl ether of bisphenol A, epoxidised fatty acid triglycerides such as epoxidised soybean oil and the like.

The amount of second stabiliser used should be in the range 0.1 to 15 parts per hundred parts by weight of the composition for effectiveness, preferably 0.5 to 6.

In addition to adding the first and second stabilisers to the polymer in discrete form, it is possible to react the first and second stabilisers together beforehand to produce a reaction product which itself can be used as a stabiliser. Such a reaction can be carried out by reacting the two stabilisers together in a suitable non-reactive solvent, e.g. a hydrocarbon solvent, under reflux conditions. Thereafter the solvent can be removed and the product dried if so desired.

The amount of reaction product used should be in the range 0.3 to 3 parts per hundred parts by weight of the composition preferably 0.5 to 1.5.

The stabilisers or their reaction product can be incorporated into the polyketone by essentially any known method as this is not deemed to be critical, provided that intimate mixing is achieved. For instance, providing they do not interfere with the polymerisation reactions, they may be incorporated into the polymerisation mixture prior to or during polymerisation. Alternatively, they may be mixed with the polymer after the polymerisation is complete by direct mixing with the polymer powder or by adding as a solution in a suitable solvent which is subsequently volatilised out of the composition. Intimate mixing is then achieved when the polymer is molten by shearing in a batch mixer or continuous extruder.

In addition to the components defined above, the composition may contain further additives such as antioxidants, blowing agents, mould release agents and other materials conventional in the art.

The improved stability of the composition of the present invention compared to the original polyketone manifests itself as an improvement in melt flow rate and in particular a maintenance of melt flow rate over a long period of time.

The compositions of the present invention may be readily melt processed and hence can be used in the manufacture of containers forfood and drink, automotive parts, wires, cables and structural items for the construction industry.

The following Examples now illustrate the invention.

COMPARATIVE TEST A

A sample of polyketone (an ethylene-propylene-carbon monoxide terpolymer having an intrinsic viscosity of 1.65 dlg$^{-1}$, measured in m-cresol at 30° C., and a peak melting point of 208° C. as measured by Differential Scanning Calorimetery) was processed in a laboratory batch melt mixer (Brabender Plasticorder) with a rotor speed of 60 rpm and an initial temperature of 217°±2° C. Mixing was carried out under a nitrogen blanket achieved by a flow of nitrogen passing through the rotor shaft and over teh top of the ram. The melt flow of the polymer was measured using a Davenport Melt Index Tester at 240° C. with a 21.6 kg load. The melt flow was taken as the 30 second flow 3 minutes after charging the polymer into the barrel of the instrument at temperature. Otherwise standard procedures were followed (ASTM D 1238-86).

The melt flow rate of the unprocessed polyketone was measured as 53 g/10 minutes whilst after processing for 20 minutes in the batch melt mixer the product would not flow at all.

Comparative Test B, C, D and E

The procedure of Comparative Test A, was followed except that only Reoplast 39 (ex Ciba Geigy-epoxidised soybean oil) or only aluminium isopropoxide (ex Aldrich) was added manually to the polyketone prior to processing. The melt flow rates after 30 minutes processing together with related data are given in the Table.

Examples 1 and 2

The procedure of Comparative Test A was followed except that in these experiments mixtures of stabilisers were used. The melt flowrates after 30 minutes processing together with related data are given in Table 1.

TABLE 1

| | Additives | | Mini- | | Final | Melt Flow |
|---|---|---|---|---|---|---|
| | Reoplast 39 (phr) | Aluminium Isopropoxide (phr) | mum Torque (gm) | Final Torque (gm) | Melt Temp (°C.) | Rate (g/10 min) |
| CTB | 1 | 0 | 1200 | 2020 | 240 | No flow |
| CTC | 3 | 0 | 800 | 1230 | 228 | 4.3 |
| CTD | 5 | 0 | 550 | 800 | 224 | 12 |
| CTE | 0 | 1 | 1410 | 1830 | 244 | 8.4 |
| Ex. 1 | 0.5 | 1 | 1320 | 1750 | 243 | 13 |
| Ex. 2 | 3 | 1 | 850 | 1000 | 227 | 30 |

Examples 1 and 2 show an increase in melt flow rate after 30 minutes as compared to the unstabilised materials. In addition, the degree of stabilisation is clearly greater than that achieved with either of the two stabilisers alone (compare Example 2 with Comparative Tests C and E). The increase in melt temperature and rotor torque over 30 minutes is also given, indicating the extent to which crosslinking has taken place in each case.

Comparative Test F and Examples 3 and 4

Four batches of polyketone powder, intrinsic viscosities in the range 1.42 to 1.52 $dlg^{-1}$, as measured in m-cresol at 30° C., and melting points in the range 191°-195° C., as measured by the peak of the DSC endotherm on scanning at 10° C. $min^{-1}$, were dry blended by mechanical shaking. The melt flow rate of the powder mixture was approximately 40 g/10 min at 240° C. and 5 kg.

Material from this powder blend was processed on the Brabender Plasticorder and behaviour was monitored over 30 minutes. Processing was carried out with a rotor speed of 60 rpm and an initial temperature of 215° C.

Details of processing responses and melt flow index after processing, measured at 240° C. with a 5 kg load, are given in Table 2. Polymer was processed without any additives (CTF) with 1 pph aluminium isopropoxide (Aldrich) (CTG) 0.3 pph aluminium isopropoxide and 0.7 pph. Rheoplast 39 by Ciba Geigy, an epoxidised soyabean oil (Ex.4) and 1 pph of a reaction product of aluminium isopropoxide and Reoplast 39 (Ex.3). The reaction product was prepared as follows.

METHOD

A 100 $cm^3$ round bottom flask fitted with a 10 cm distillation column and condenser was flushed with nitrogen. Aluminium isopropoxide (2.756 g), Rheoplast 39 (6.50 g) and dry toluene (50 $cm^3$) was placed into the flask through a stream of nitrogen. The mixture was heated to mild reflux for one hour then the reaction temperature was increased and a distillate collected (5.69 g). The distillate was analysed by gas liquid chromatography and contained isopropanol (0.375 g). The mixture was cooled to room temperature and the distillation apparatus removed. The remaining solvent was removed in vacuo at 40° C. The product was further dried in vacuo at 40° C. for one day.

TABLE 2

| | Additives | Minimum Torque (gm) | Final Torque (gm) | Final Melt Temp (°C.) | Melt Flow Rate (g/10 min) |
|---|---|---|---|---|---|
| CTF | None | 590 | 1290 | 231 | 0 |
| CTG | 1 pph aluminium isopropoxide | 580 | 720 | 220 | 19 |
| Ex 3 | 1 pph AIP/Rheoplast Reaction Product | 570 | 720 | 221 | 16 |
| Ex 4 | 0.3 pph AIP + 0.7 pph Rheoplast | 560 | 690 | 220 | 17 |

Example 3 shows that the two stabilisers can be reacted together before use and that the reaction product is an effective stabiliser.

I claim:

1. A polymer composition stabilised against degradation during melt processing which comprises (a) a major amount of a linear alternating copolymer of carbon monoxide, ethylene and a $C_3$ to $C_6$ normal olefin (b) a minor effective amount of a first stabiliser comprising an aluminium trialkoxide, an aluminium phenoxide or an aluminium containing hydrolysis product of such compounds and (c) a minor effective amount of a second stabiliser selected from the group consisting of 1,2-epoxyoctadecane, styrene epoxide, butyl-epoxy stearate, epoxidised polybutadiene, poly (alkylglycidyl) ethers, dicyclopentadiene diepoxide diglycidyl ether of bisphenol A, and epoxidized fatty acid triglycerides.

2. A polymer composition as claimed in claim 1 wherein the amount of the first stabiliser is in the range 0.3 to 3 parts per hundred parts by weight of the polymer composition.

3. A polymer composition as claimed in claim 1 wherein the amount of first stabiliser is in the range 0.5 to 1.5 parts per hundred parts by weight of the polymer composition.

4. A polymer composition as claimed in claim 1 wherein the amount of the second stabiliser is in the range 0.5 to 6 parts per hundred parts by weight of the polymer composition.

5. A polymer composition as claimed in claim 1 wherein the first stabiliser is an aluminium trialkoxide having the general formula $Al(OR)_3$ where the R groups are independently $C_3$ to $C_{12}$ alkyl.

6. A polymer composition as claimed in claim 1 wherein the R groups are identical $C_3$ to $C_8$ secondary alkyl groups.

7. A polymer composition as claimed in claim 1 wherein the first stabiliser is an aluminium phenoxide of formula $(Z)_{x-x}Al(OR^1)_x$ wherein the Z groups are independently phenoxides which are di- or tri-substituted at the 2,6-; 2,4-; 3,5-, or 2,4,6- positions with $C_3$ to $C_5$ branched alkyl groups, the $R^1$ groups are independently $C_1$ to $C_{10}$ alkyl and x is 0, 1 or 2.

8. A polymer composition as claimed in claim 1 wherein the $C_3$ to $C_6$ normal olefin is propylene.

9. A stabilized polymer composition as defined in claim 1, wherein said second stabilizer is an epoxidized fatty acid triglyceride.

10. A stabilized polymer composition as defined in claim 9, wherein said epoxidized fatty acid triglyceride is epoxidized soybean oil.

11. A stabilized polymer composition as defined in claim 1, wherein the first stabilizer is an aluminum trialkoxide having the general formula Al(OR)$_3$ where the R groups are independently $C_3$ to $C_{12}$ alkyl and the second stabilizer is an epoxidized fatty acid triglyceride.

12. A stabilized composition as defined in claim 1, wherein the first stabilizer is aluminum isopropoxide and the second stabilizer is epoxidized soybean oil.

* * * * *

UNITED STATES PATENT AND TRADEMARK OFFICE
CERTIFICATE OF CORRECTION

PATENT NO. : 5,232,968
DATED : August 3, 1993
INVENTOR(S) : NEIL S. DAVIDSON

It is certified that error appears in the above-indentified patent and that said Letters Patent is hereby corrected as shown below:

Col. 4, l. 53, correct the spelling of the word "the"

Signed and Sealed this

Seventeenth Day of May, 1994

Attest:

BRUCE LEHMAN

*Attesting Officer*     *Commissioner of Patents and Trademarks*